Jan. 30, 1951  C. E. DORSEY, JR  2,539,733
MOTOR VEHICLE WITH TANDEM CONVERSION ATTACHMENT
Filed Feb. 18, 1949  3 Sheets-Sheet 2
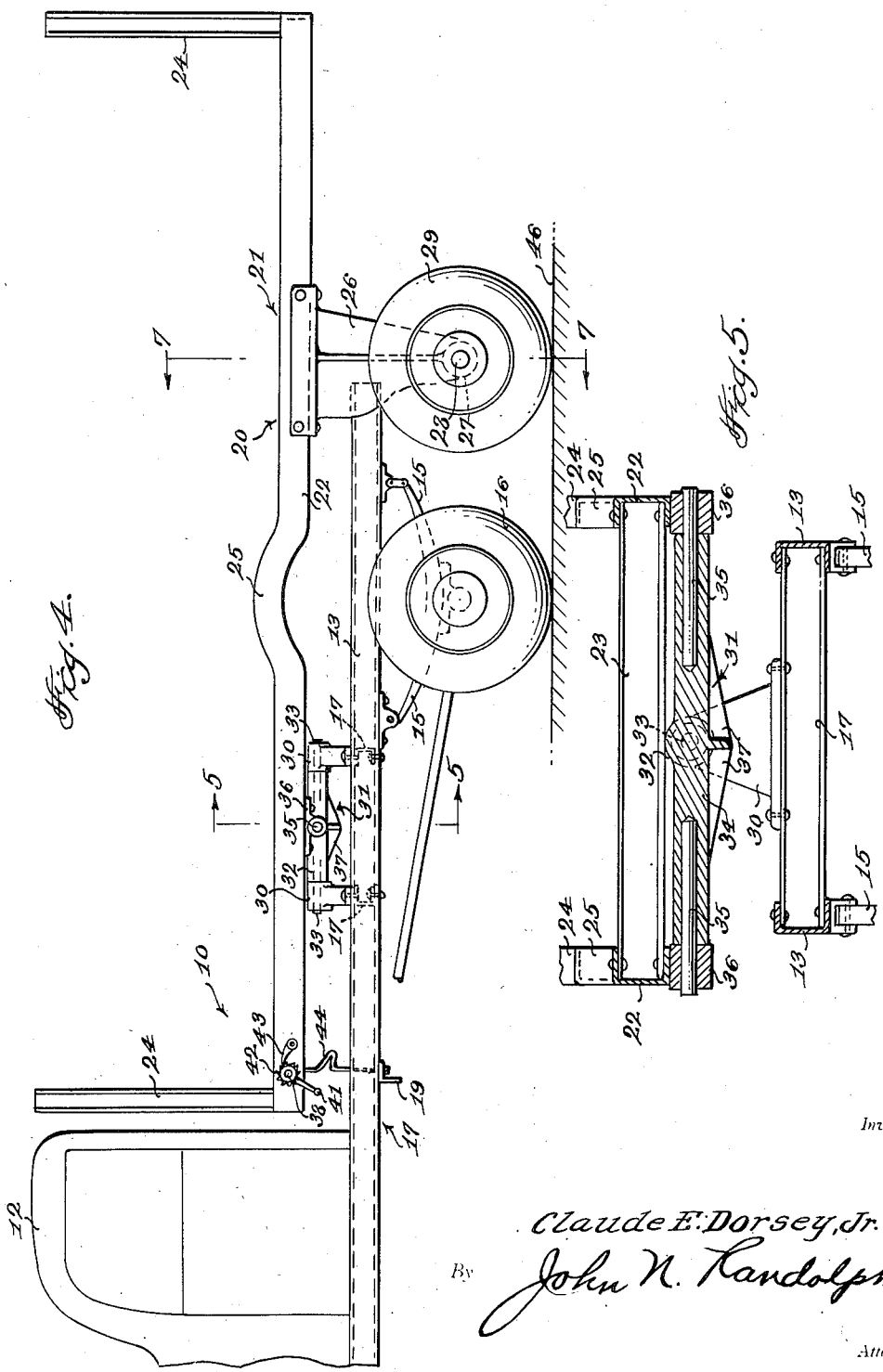
Inventor
Claude E. Dorsey, Jr.
By John N. Randolph
Attorney

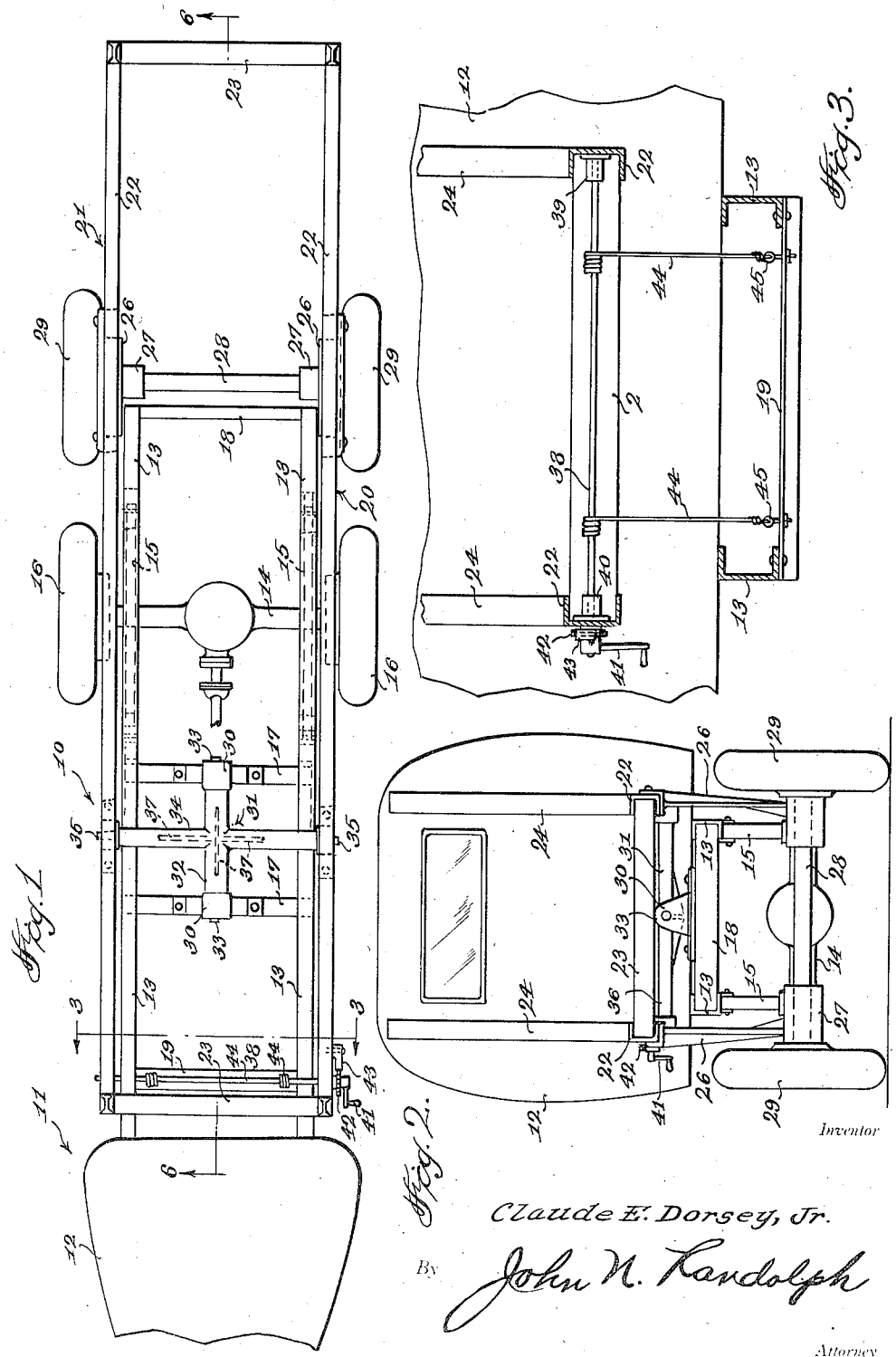

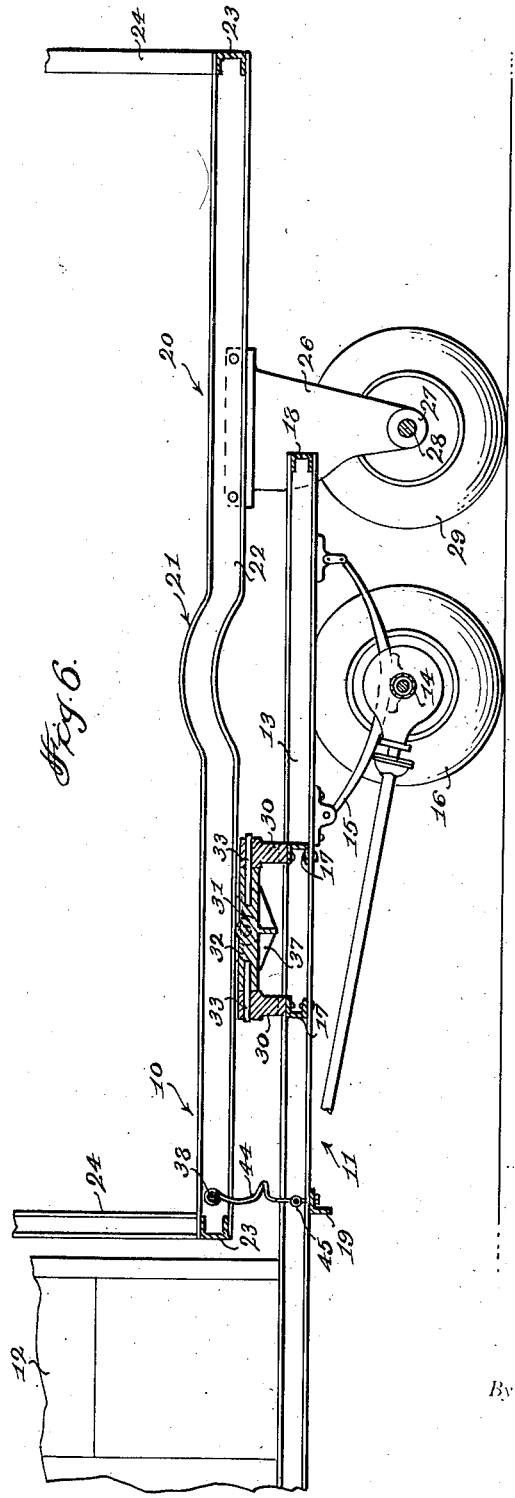

Patented Jan. 30, 1951

2,539,733

UNITED STATES PATENT OFFICE 2,539,733

MOTOR VEHICLE WITH TANDEM CONVERSION ATTACHMENT

Claude E. Dorsey, Jr., Elba, Ala.

Application February 18, 1949, Serial No. 77,146

8 Claims. (Cl. 280—33.02)

This invention relates to a novel construction of motor vehicle or truck having a demountable tandem conversion unit for increasing the load capacity of the vehicle and by means of which the load may be proportioned between the motor vehicle and the tandem conversion unit.

Another and primary object of the present invention is to provide a truck tandem conversion assembly for motor trucks which is so designed as to relieve the truck frame of the torsional or twisting strain to which it is normally subjected when employed with a conventional tandem unit.

Another object of the invention is to provide a conversion unit which is so constructed as to allow any reasonable proportioning of the load between the truck axle and an axle of the conversion unit by longitudinally adjusting the conversion unit relatively to the truck frame.

Still another object of the invention is to provide a conversion unit capable of being employed without springs between its frame and axle and which is so connected to a truck frame as to utilize the springs thereof as its cushioning medium, through proper proportioning of the load on the conversion unit and truck.

A further object of the invention is to provide a conversion unit which is capable of oscillatory movement relatively to a truck frame to which it is connected in directions either longitudinally or transversely of the axis of the truck and conversion unit.

Still a further object of the invention is to provide a conversion unit having means to maintain it in correct alignment with the axis of a motor vehicle, to which the unit is connected, while moving around curves, to minimize the torsional strain transmitted to the truck or draft vehicle.

Various other objects and advantages of the invention will hereinafter become more fully apparent from the following description of the drawings, illustrating a presently preferred embodiment thereof, and wherein:

Figure 1 is a fragmentary top plan view showing a motor vehicle equipped with the tandem conversion unit;

Figure 2 is a rear elevational view thereof;

Figure 3 is a cross sectional view taken substantially along a plane as indicated by the line 3—3 of Figure 1 and on an enlarged scale;

Figure 4 is a fragmentary side elevational view of the motor vehicle and conversion unit;

Figure 5 is a cross sectional view thereof taken substantially along a plane as indicated by the line 5—5 of Figure 4;

Figure 6 is a longitudinal substantially central sectional view taken substantially along a plane as indicated by the line 6—6 of Figure 1;

Figure 7 is a cross sectional view, on an enlarged scale, taken substantially along a plane as indicated by the line 7—7 of Figure 4; and Figure 8 is a perspective view of a part of the structure.

Referring more specifically to the drawings, the motor vehicle with tandem conversion unit attached is designated generally 10 and comprises the invention and includes a motor vehicle, such as a truck, designated generally 11; the frame of which, rearwardly of the truck cab 12, includes longitudinally extending sill members 13 which are laterally spaced relatively to one another and which are yieldably supported on the rear axle 14 of the truck 11 by a conventional leaf-type truck spring 15. A driven ground wheel 16 is fixed to each end of the rear axle 14 and said wheels 16 constitute the driven wheels of the truck 11. The sill members 13 are preferably channel-shaped in cross section and arranged to open inwardly and are connected, forwardly of the rear axle 14, by a pair of longitudinally spaced transversely extending braces 17 which likewise are preferably channel-shaped in cross section. The sill members 13 may also be braced at their rear ends by a transverse brace 18 and at their forward ends by a cross brace 19, illustrated in Figure 3.

The truck tandem conversion assembly, constituting the other part of the truck and tandem combination 10, includes a frame, designated generally 21, composed of longitudinally extending, laterally spaced sills 22 which are connected at their ends by cross braces 23 and which may also be connected at a plurality of longitudinally spaced points by additional cross braces, as required or desired. The frame 21 may be provided with upstanding corner posts 24 which rise from the corners formed by the sills 22 and braces 23. The sills 22, substantially intermediate of their ends, are provided with transversely aligned upwardly bowed portions 25 and rearwardly thereof, each of said sills has a depending hanger 26 secured thereto. The hangers 26 are relatively wide in a direction longitudinally of the frame 21, for a purpose which will hereinafter become apparent and are provided at their lower ends with bearing or sleeve portions 27 to receive an axle 28 on the ends of which are journaled ground engaging wheels 29, constituting the supporting wheels of the tandem unit 20.

A bearing 30 is secured to and rises from each of the cross braces 17 and said bearings 30 are disposed in longitudinal alignment with one another and in alignment with the longitudinal axis of the truck 11 and tandem 20, as will hereinafter become apparent.

As a preferred method of providing a flexible connection between the truck and tandem frames, a cross-shaped shaft, designated generally 31, is provided with a longitudinally disposed shaft portion 32 having spindles 33 projecting from the ends thereof and which are journaled in the bearings 30. The other, transverse shaft 34 of the cross shaft 31, which may be longer than the longitudinal shaft 32, is provided with similar spindles 35 which project from the ends thereof and which are journaled in bearings 36 which are fastened to and depend from the sills 22 and which are arranged in transverse alignment. The bearings 36 are disposed forwardly of the upwardly bowed sill portions 25, which portions are preferably disposed approximately over the truck axle 14; however, the bearings 36 may be displaced forwardly or rearwardly relatively to the sills 22 for varying the proportioning of the load between the truck 11 and tandem trailer 20, as will hereinafter become apparent. It will be noted, and as clearly illustrated in Figures 4 and 5, that the bearings 30 will support the sills 22 substantially above the level of the sills 13 to allow the cross shaft 31 to rock on its longitudinal axis as provided by its shaft 32 and as seen in Figures 2, 3 and 5, the sills 22 are spaced a sufficiently greater distance apart than the sills 13 to permit said sills 22 to straddle the sills 13. When the bearings 36 are mounted in a normal position, as illustrated in Figure 4, the rear end portions of the sills 13 will extend rearwardly to between the relatively wide web portions of the hangers 26 and said hangers are spaced so as to straddle said rear end portions of the sills 13 and are disposed in sufficiently close proximity thereto to maintain the truck frame and tandem frame in alignment when the combination vehicle 10 is moving around a curve thereby relieving both the truck and tandem frames of twisting and torsional strains which would otherwise be exerted thereon.

The shaft portions 32 and 34 of the cross shaft 31 are preferably provided with reinforcing or strengthening webs or flanges 37.

As best illustrated in Figure 3, a shaft 38 extends transversely of the frame 21, adjacent its forward end, and is journaled in bearings 39 and 40 which are connected to the sills 22. One end of the shaft 38 protrudes outwardly from one of the sills 22 and has a crank 41 fixed thereto for revolving the shaft 38. A ratchet wheel 42 is also fixed to said end of the shaft 38, as best seen in Figure 4 and is adapted to be engaged by a gravity actuated pawl 43 to normally hold said shaft against rotation in one direction. One or more cables 44 are wound on and secured to the shaft 38 and have depending free ends which are connected by eye bolt fastenings 45 to the cross brace 19 of the sills 13. By revolving the shaft 38 in one direction the cable or cables 44 can be wound thereon for drawing the forward end of the tandem frame 21 downwardly to cause said frame to rock on its transverse pivots 35, 36 to elevate the rear end of the tandem frame to raise the wheels 29 thereof out of contact with a surface 46 so that the vehicle 10 can travel without a load and with the conversion unit 20 supported entirely by the truck 11. The pawl 43 will hold the shaft 38 to prevent it from turning in a direction to permit the unwinding of the cables 44, until said pawl is manually released.

When the pawl 43 is released and swung away from the ratchet wheel 42 so that the cables 44 can unwind from the shaft 38, the rear end portion of the tandem frame 21 will swing downwardly and will be supported by the ground wheels 29. The tandem frame 21 can be loaded and the load so arranged thereon that it will be borne in desired proportions by the tandem axle 28 and the rear truck axle 14, preferably with forty to fifty percent of the load borne by the truck axle and the remainder of the load borne by the tandem axle 28. As previously stated, by moving the bearings 36 forwardly or rearwardly the proportioning of the load between the truck and tandem can be varied as desired. It will be readily apparent that the conversion frame 21 is capable of rocking substantially universally relatively to the truck frame, that is, on an axis either longitudinally or transversely of the truck frame so that in moving over uneven ground the tandem frame and truck frame may rock independently of one another in directions longitudinally or laterally without exerting a torsional strain or stress one upon the other, thereby eliminating all of the strain or stresses incident to a rigidly mounted tandem frame and the complicated systems of equalizers which are accordingly required.

Whereas in the embodiment of the invention as disclosed, the entire weight of the load is cushioned by the truck springs 15, it will be readily apparent that to accommodate particularly heavy loads similar leaf springs could be substituted for the hangers 26 to yieldably mount the tandem frame 21 on the axle 28.

Various modifications and changes are contemplated and may obviously be resorted to, without departing from the spirit or scope of the invention as hereinafter defined by the appended claims.

I claim as my invention:

1. A wheeled vehicle comprising a motor truck, said truck having a frame extending rearwardly from a cab thereof and yieldably supported by rear wheels of the truck; a tandem conversion unit including an elongated frame having a forward portion normally disposed over the rearwardly extending frame of the truck and including longitudinally extending laterally spaced sills, said sills being spaced a greater distance apart than the width of the truck frame for straddling the truck frame, laterally spaced wheels for supporting the conversion unit and disposed rearwardly of said rear truck wheels, and a flexible connection for connecting the truck frame to the tandem frame for rocking movement of the frames relatively to one another on axes disposed longitudinally and transversely of the wheeled vehicle, said flexible connection including a cross-shaped shaft, longitudinally aligned bearings fixedly secured to the truck frame for journaling aligned ends of the cross-shaped shaft, and transversely aligned bearings fixedly fastened to the conversion unit frame for journaling the other aligned ends of the cross-shaped shaft.

2. A wheeled vehicle comprising a motor truck, said truck having a frame extending rearwardly from the cab thereof and yieldably supported by rear wheels of the truck; a tandem conversion unit including an elongated frame having a forward portion normally disposed over the rearwardly extending frame of the truck and including longitudinally extending laterally spaced sills, said sills being spaced a greater distance apart than the width of the truck frame for straddling the truck frame, laterally spaced wheels for supporting the conversion unit and disposed rearwardly of said rear truck wheels, and a flexible connection for connecting the truck frame to the tandem frame for rocking movement of the frames relatively to one another on axes disposed longitudinally and transversely of the wheeled vehicle, said flexible connection including a cross-shaped shaft, longitudinally aligned bearings fixedly secured to the truck frame for journaling aligned ends of the cross-shaped shaft, and transversely aligned bearings fixedly fastened to the conversion unit frame for journaling the other aligned ends of the cross-shaped shaft, said first mentioned bearings being disposed in alignment with the longitudinal axis of the wheeled vehicle.

3. A wheeled vehicle comprising a motor truck, said truck having a frame extending rearwardly from the cab thereof and yieldably supported by rear wheels of the truck; a tandem conversion unit including an elongated frame having a forward portion normally disposed over the rearwardly extending frame of the truck and including longitudinally extending laterally spaced sills, said sills being spaced a greater distance apart than the width of the truck frame for straddling the truck frame, laterally spaced wheels for supporting the conversion unit and disposed rearwardly of said rear truck wheels, and a flexible connection for connecting the truck frame to the tandem frame for rocking movement of the frames relatively to one another on axes disposed longitudinally and transversely of the wheeled vehicle, and means adjustably connecting the forward end of the tandem conversion unit frame to the truck frame for rocking the tandem conversion unit on the flexible connection to support said unit on the truck frame with the wheels thereof in an elevated position.

4. A wheeled vehicle comprising a motor truck, said truck having a frame extending rearwardly from the cab thereof and yieldably supported by rear wheels of the trucks; a tandem conversion unit including an elongated frame having a forward portion normally disposed over the rearwardly extending frame of the truck and including longitudinally extending laterally spaced sills, said sills being spaced a greater distance apart than the width of the truck frame for straddling the truck frame, laterally spaced wheels for supporting the conversion unit and disposed rearwardly of said rear truck wheels, and a flexible connection for connecting the truck frame to the tandem frame for rocking movement of the frames relatively to one another on axes disposed longitudinally and transversely of the wheeled vehicle, an axle on which the wheels of the tandem conversion unit are mounted, hanger brackets connecting the conversion unit frame to said axle and disposed to straddle the rear end of the truck frame.

5. A tandem conversion unit for wheeled vehicles comprising, in combination with a long wheel base motor vehicle having a frame extending rearwardly from the vehicle cab and yieldably supported by rear wheels of the motor vehicle, an elongated tandem unit conversion frame having a forward end disposed over the truck frame forwardly of the rear wheels thereof and a rear portion extending rearwardly of the rear end of the truck frame, said rear truck wheels being disposed approximately intermediate of the ends of the conversion frame, a pair of laterally spaced wheels supporting the rear end of the tandem frame and disposed rearwardly of the rear truck wheels, and a flexible connection between the truck frame and tandem frame for rocking movement of said frames relatively to one another on axes disposed longitudinally and transversely of the frames, said flexible connection being disposed approximately intermediate of the forward end of the conversion frame and the rear truck wheels.

6. A tandem conversion unit as in claim 5, said flexible connection including a pair of shafts connected in crossed relationship, a pair of bearings fixed to the truck frame and disposed in alignment with the axis thereof for journaling the ends of one of said shafts, and a pair of transversely aligned bearings fixed to the conversion unit frame for journaling the ends of the other of said shafts.

7. A tandem conversion unit as in claim 5, and means for drawing the forward end of the conversion unit frame downwardly with respect to the truck frame for elevating the wheels of the conversion unit.

8. A tandem conversion unit as in claim 5, said flexible connection including a pair of shafts connected in crossed relationship, a pair of bearings fixed to the truck frame and disposed in alignment for journaling the ends of one of said shafts, and a pair of aligned bearings fixed to the conversion unit frame for journaling the ends of the other of said shafts, one of said shafts being disposed in axial alignment with the truck frame and conversion unit frame and the other shaft being disposed transversely thereof.

CLAUDE E. DORSEY, Jr.

REFERENCES CITED

The following references are of record in the file of this patent:

UNITED STATES PATENTS

| Number | Name | Date |
| --- | --- | --- |
| 927,256 | Luthke | July 6, 1909 |
| 1,179,793 | Barber | Apr. 18, 1916 |
| 1,377,138 | Morrison | May 3, 1921 |
| 2,360,654 | Day | Oct. 17, 1944 |